(12) United States Patent
Shiraishi et al.

(10) Patent No.: US 7,140,732 B2
(45) Date of Patent: Nov. 28, 2006

(54) PROJECTION TYPE IMAGE DISPLAY DEVICE

(75) Inventors: Mikio Shiraishi, Yokohama (JP);
Fusamitsu Tsubata, Yokohama (JP);
Hiroshi Oshima, Fujisawa (JP);
Michiyuki Yoshino, Yokohama (JP);
Yoshimasa Takeuchi, Yokohama (JP);
Tatsumi Hasebe, Hichiso (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/809,003

(22) Filed: Mar. 24, 2004

(65) Prior Publication Data

US 2004/0263792 A1 Dec. 30, 2004

(30) Foreign Application Priority Data

Jun. 25, 2003 (JP) ............................. 2003-180425

(51) Int. Cl.
*G03B 21/00* (2006.01)
(52) U.S. Cl. ............................ 353/33; 353/119; 349/58
(58) Field of Classification Search ................ 353/119, 353/33, 81, 84, 102; 349/56–58, 7
See application file for complete search history.

(56) References Cited

U.S. PATENT DOCUMENTS

| | | | | |
|---|---|---|---|---|
| 5,095,606 A | * | 3/1992 | Barrick | ........................ 29/509 |
| RE37,836 E | * | 9/2002 | Fujimori et al. | ............. 353/119 |
| 6,540,360 B1 | * | 4/2003 | Furuhata et al. | .............. 353/31 |
| RE38,194 E | * | 7/2003 | Iinuma et al. | .............. 353/119 |
| 6,657,680 B1 | * | 12/2003 | Takizawa | ....................... 349/5 |
| 6,906,840 B1 | * | 6/2005 | Fujimori et al. | ............. 359/237 |
| 2003/0058537 A1 | * | 3/2003 | Domroese et al. | .......... 359/495 |

FOREIGN PATENT DOCUMENTS

| | | |
|---|---|---|
| JP | 11-084196 | 3/1999 |
| JP | 2000-105434 | 4/2000 |
| JP | 2001-195006 | 7/2001 |
| JP | 2001-209122 | 8/2001 |
| JP | 2002-268032 | 9/2002 |
| JP | 2002-372750 | 12/2002 |

* cited by examiner

*Primary Examiner*—W. B. Perkey
*Assistant Examiner*—Andrew Sever
(74) *Attorney, Agent, or Firm*—Townsend and Townsend and Crew LLP

(57) ABSTRACT

A projection type image display device superior in reliability and also superior in both repairability and maintainability is to be provided at a low cost. Support members disposed between liquid crystal panels and a prism are made of a thermoplastic polymer material, and the liquid crystal panels and the support members are fixed to each other by heat-fusion of the support members. When it is necessary to remove a liquid crystal panel which is at fault for example from the corresponding support member, the fused portion on the support member side which less expensive is cut off, thereby permitting the liquid crystal panel which is expensive to be taken out re-utilizably without any damage thereto.

20 Claims, 11 Drawing Sheets

PROJECTION TYPE IMAGE DISPLAY DEVICE

BACKGROUND OF THE INVENTION

The present invention relates to a display device which projects an image onto a screen with use of light valve elements such as liquid crystal panels. In particular, the present invention is concerned with a projection type image display device such as an LCD projector or a rear projection type display device.

A projection type image display device such as an LCD projector or a rear projection type display device has heretofore been known. In such a projection type image display device, light emitted from a light source such as an electric bulb is subjected to light intensity modulation for conversion of the light into light and shade for each image in accordance with an image signal by means of light valve means such as liquid crystal panels to form an optical image and the optical image is projected as image on a larger scale onto a screen or the like.

Many of the projection type image display devices available recently operate as follows. Light emitted from a light source is split into light rays of plural colors (e.g., three colors) by a light splitting means, and the light rays are then modulated by light valve means taking charge of the respective colors (in the following description the light valve means are assumed to be liquid crystal panels for convenience' sake). The modulated light rays are passed through a synthesizing prism so that light having plural color components is obtained, the light obtained thus is then projected through a projection lens to the exterior of the device and is displayed as image.

In this case, it is necessary for the synthesizing prism and the liquid crystal panels to be in a positional relation such that the plural components, e.g., three-color components, are all fixed. If even one of the three liquid crystal panels is displaced, a color shift or a focal shift will occur in the synthesized display image, with the result that the quality of the image is impaired.

In a conventional manufacturing process for a projection type image display device using liquid crystal panels as light valve means, when the liquid crystal panels are to be mounted around a synthesizing prism, a so-called convergence adjustment is performed. This convergence adjustment involves adjusting the posture and position of the liquid crystal panels and making sure that three-color components' images are coincident in the projected image. After the convergence adjustment, the liquid crystal panel is fixed at the respective positions relative to the synthesizing prism by bonding for example.

A conventional method wherein liquid crystal panels are fixed after adjusting their postures and positions relative to a synthesizing prism is disclosed, for example, in Japanese Patent laid-open No. 2002-372750. This publication describes a method wherein liquid crystal panels are mounted through a mounting member around a cross dichroic prism (hereinafter referred to simply as "prism" unless there arise any doubt) which serves as a synthesizing prism for synthesizing three-color components. Japanese Patent laid-open No. 2002-268032 discloses a construction wherein liquid crystal panels are screwed to sheet metal members and the screw portions are fused to molded members mounted in upper and lower positions of a prism. Japanese Patent Laid-open No. Hei 11-84196 discloses a construction wherein liquid crystal panels are secured to sheet metal members as support members and are thereafter bonded to a prism and a base which supports the prism. Japanese Patent Laid-open No. 2000-105434 discloses a construction wherein metallic frames attached to liquid crystal panels and a support frame attached to a prism are fused using a heat-fusing material and are mounted thereby.

SUMMARY OF THE INVENTION

In the conventional method disclosed in Japanese Patent laid-open No. 2002-372750, the mounting members and the prism are bonded together after adjusting the postures and positions of the liquid crystal panels. As a result, a system for performing convergence adjustment and fixing of the liquid crystal panels can be realized by a simple construction without relying on a complicated construction of an adjusting mechanism or the like.

In the above conventional method, however, the liquid crystal panels, which are expensive, are bonded to mounting members. In the event of failure in assembly or in the event of occurrence of any inconvenience in one of the three liquid crystal panels, for example in the event of failure of any one of the three liquid crystal panels as a result of use of the panels, the failed liquid crystal panel cannot be removed without destruction from around the prism. Therefore even the nondefective liquid crystal panels are compelled to be discarded as wastes. Also the expensive prism is often subjected to an optical coating such as anti-reflection coating on its light incidence sides. In the case where a mounting member is bonded to such a coated light incidence side and when the mounting member is to be removed upon occurrence of any inconvenience, the coated surface is damaged and eventually the expensive prism is compelled to be discarded as waste. Thus, in the conventional method in question, a thorough consideration is not given from the standpoint of re-utilization.

In the conventional method disclosed in Japanese Patent Laid-open No. 2002-268032, even in the event of occurrence of any inconvenience after assembly, the liquid crystal panels can be removed by removing screws from the sheet metal members and hence the nondefective liquid crystal panels can be re-utilized. Also, since no mounting member is bonded to the light incidence sides of the prism, the upper and lower molded members as support members can be removed without causing any optical damage to the prism and hence it is possible to re-utilize the prism.

In this conventional method, however, the liquid crystal panels are mounted with screws to the sheet metal members and a thorough consideration is not given to the point that the liquid crystal panels are apt to undergo positional deviations due to loosening of the screws.

In the conventional method disclosed in Japanese Patent Laid-open No. Hei 11-84196, even in the event the bonding of the sheet metal members as support member and the liquid crystal panels to the prism and the base should have failed, the prism can be re-utilized by removing the prism and the sheet metal members as support members.

In this conventional method, however, no clear description is found about the mounting between the sheet metal members as support members and the liquid crystal panels. In particular, the conventional method in question is deficient in recognition about the point that the mounting of liquid crystal panels is important for the stability of a three-color synthesized position after assembly. Besides, the places where the sheet metal members as support members are bonded span both an upper surface of the prism and the prism supporting base, and thus a thorough consideration is not given, either, about the stability of a long-period support for the liquid crystal panels.

In the conventional method disclosed in Japanese Patent Laid-open No. 2000-105434, it is possible to effect both posture and position adjustment for the liquid crystal panels and re-utilization of the expensive prism and liquid crystal panel components in the event of occurrence of any inconvenience.

This conventional method lacks a description on a method for fixing the liquid crystal panels and the supporting frames to each other. That is, the conventional method in question is deficient in recognition about the point that the mounting of liquid crystal panels is important for the stability of a three-color synthesized position after assembly.

The above-mentioned problems involved in the prior art are summarized as follows.

1. The position fixing method after the adjustment between liquid crystal panels and prism should ensure such a degree of stability as prevents a positional deviation after the adjustment.

2. In fixing liquid crystal panels and prism to each other, it is necessary to give consideration so that in the event of failure of any of the expensive liquid crystal panels and prism, the remaining expensive nondefective parts can be re-utilized.

The present invention has been accomplished in view of the above-mentioned problems encountered in the prior art and it is an object of the invention to solve those problems and provide at low cost a projection type image display device superior in reliability and also superior in both repairability and maintainability. In particular, in connection with adjustment and fixing between liquid crystal panels and a prism, the present invention aims at attaining the re-utilization of expensive parts and high reliability.

According to means adopted by the present invention for solving the above-mentioned problems, a thermoplastic polymer material is used as the material of support members which are disposed between liquid crystal panels and a prism, allowing the liquid crystal panels and the support members to be fixed together by heat-fusion of the support members. In the case where it is necessary to remove a faulty liquid crystal panel from its support member, the fused portion on the support member side which is less expensive is cut off and thus serves as means for taking out the liquid crystal panel re-utilizably without damage to the expensive liquid crystal panel. Bonding between the prism and the support members is done at portions of the prism other than light incidence/exit sides. When it is required to remove a liquid crystal panel from its support member due to failure for example, the bonded portion on the support member side which is less expensive is removed and thus serves as means for taking out the liquid crystal panel re-utilizably without damage to the expensive prism.

DETAILED DESCRIPTION OF THE PREFERRED EMBODIMENTS

Embodiments of the present invention will be described hereinunder with reference to the accompanying drawings. In all the drawings, components having common functions are identified by like reference numerals, and explanations thereof once given will not be repeated for avoiding complexity.

FIGS. 1 to 8 are explanatory diagrams of a first embodiment according to the present invention. Explanations will be given with reference to those figures successively, beginning with FIG. 1.

Figure 1A:
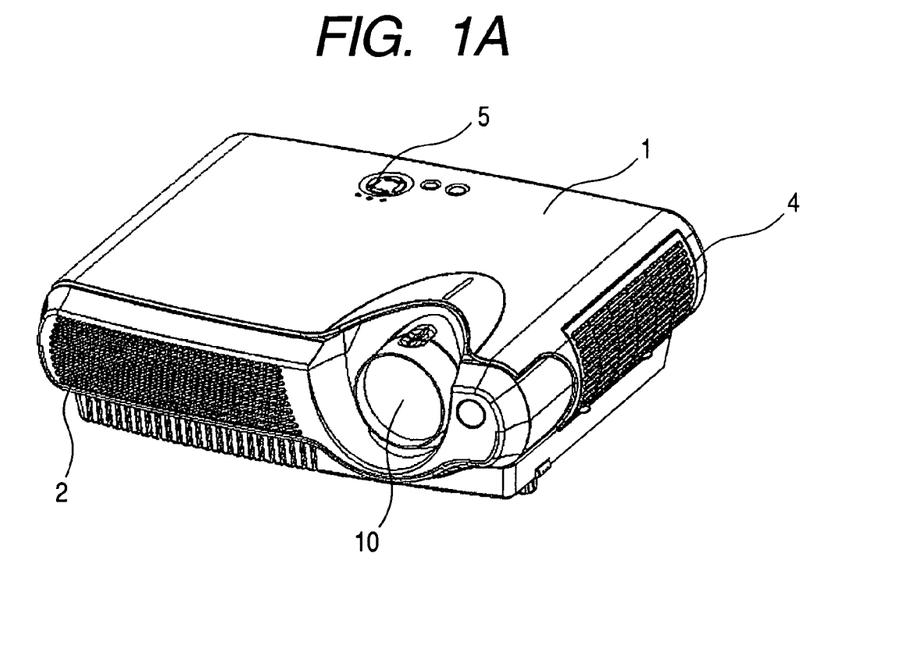
FIGS. 1A and 1B are perspective views showing an appearance of a projection type image display device according to a first embodiment of the present invention.
Figure 1B:
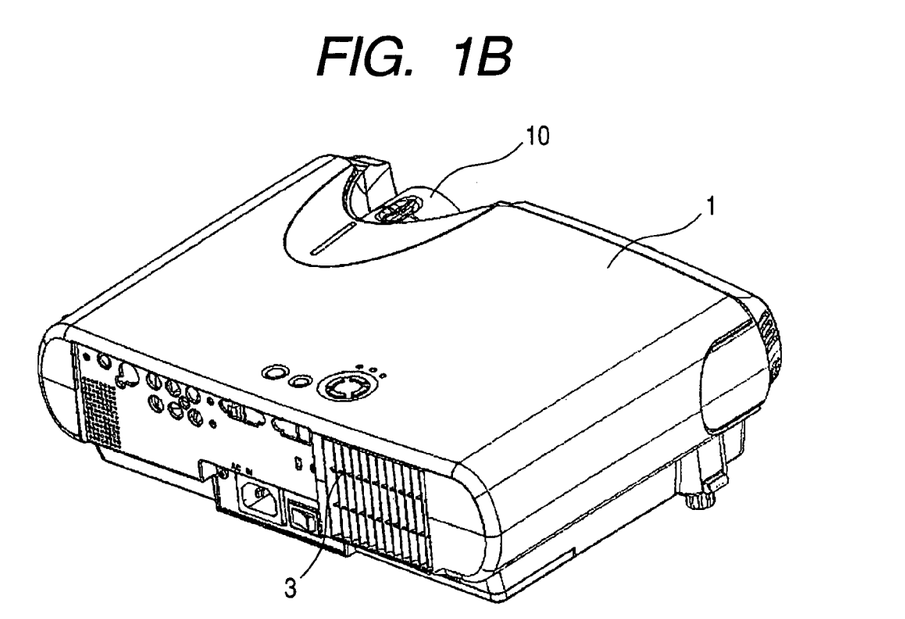

FIG. 1 is a perspective view showing an appearance of a projection type image display device according to a first embodiment of the present invention, in which FIG. 1A is a front view of the projection type image display device indicated at 1 and FIG. 1B is a back view of thereof.

In the projection type image display device 1, as shown in FIG. 1A, an intake/exhaust port 2 faces in the same direction as a projection lens 10, i.e., on a front side, and as shown in FIG. 1B, an intake/exhaust port 3 is formed on a rear side. Further, an operating button 5 and a panel intake port 4 are disposed so as to face the exterior of the device 1.

The projection type image display device 1 is operated by operating the operating button 5 from the exterior of the device. In operation, an image is projected and displayed onto a screen or the like (not shown) from the projection lens 10.

Figure 2:
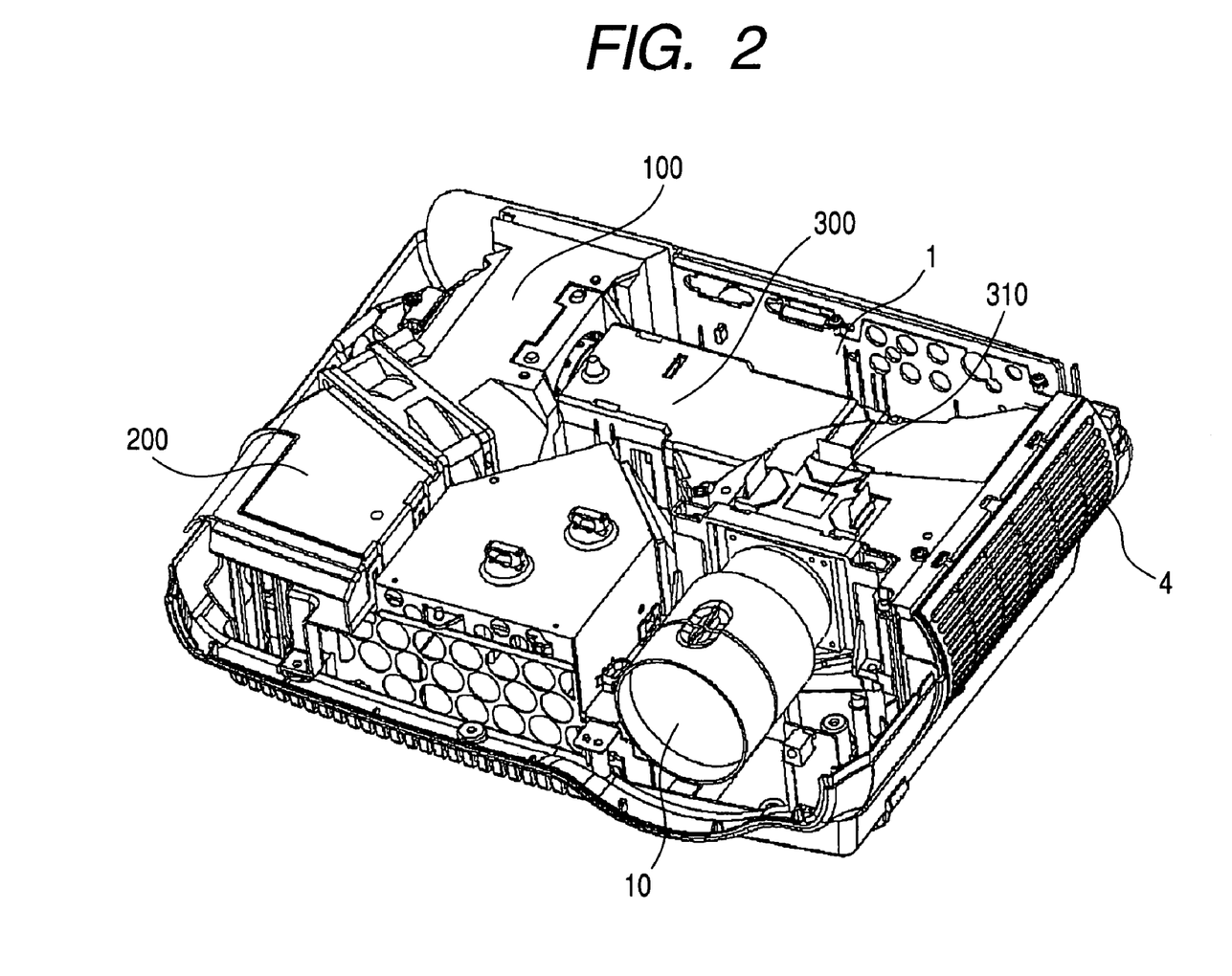
FIG. 2 is a perspective view showing an interior construction of the projection type image display device, according to the first embodiment of the present invention.

FIG. 2 is a perspective view showing an interior construction of the projection type image display device 1.

In FIG. 2, an optical engine section-300 is provided in the interior of the projection type image display device 1. An illumination means 100 is disposed in the optical engine section 300. In the optical engine section 300, light emitted from the illumination means 100 is split into three colors by a light splitting means (not shown), then the three-color light rays are modulated by liquid crystal panels (not shown) which are light valve means, and the thus-modulated light rays are synthesized by a prism (not shown). Lastly, the modulated light after the synthesis is projected and displayed as image onto a screen (not shown) which is disposed outside the device, by the projection lens 10 as projection means. A prism unit 310, which is disposed in the optical engine section 300, is provided with liquid crystal panels corresponding to the three colors are attached respectively to three faces of a prism (the details will be described later). The projection lens 10 is attached to the prism unit 310.

Figure 3:
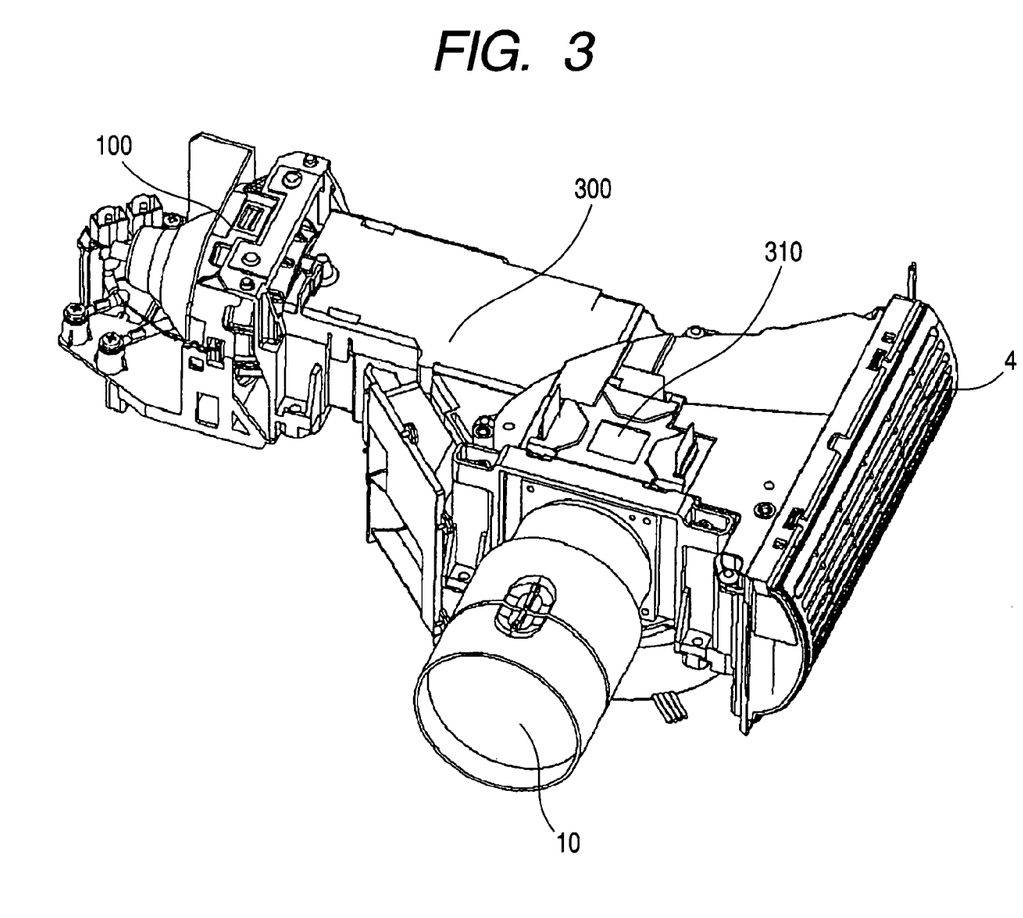
FIG. 3 is a perspective view showing the construction of an optical engine section in the interior of the projection type image display device, according to the first embodiment of the present invention.

FIG. 3 is an explanatory diagram of the optical engine section 300 installed in the interior of the projection type image display device 1.

In FIG. 3, the optical engine section 300 includes an illumination means 100, a light splitting means (not shown), liquid crystal panels (not shown) as light valve means, a prism (not shown) as a light synthesizing means, and a projection lens 10. The prism unit 310 includes the liquid crystal panels (not shown), the prism (not shown) and the projection lens 10.

Figure 4:
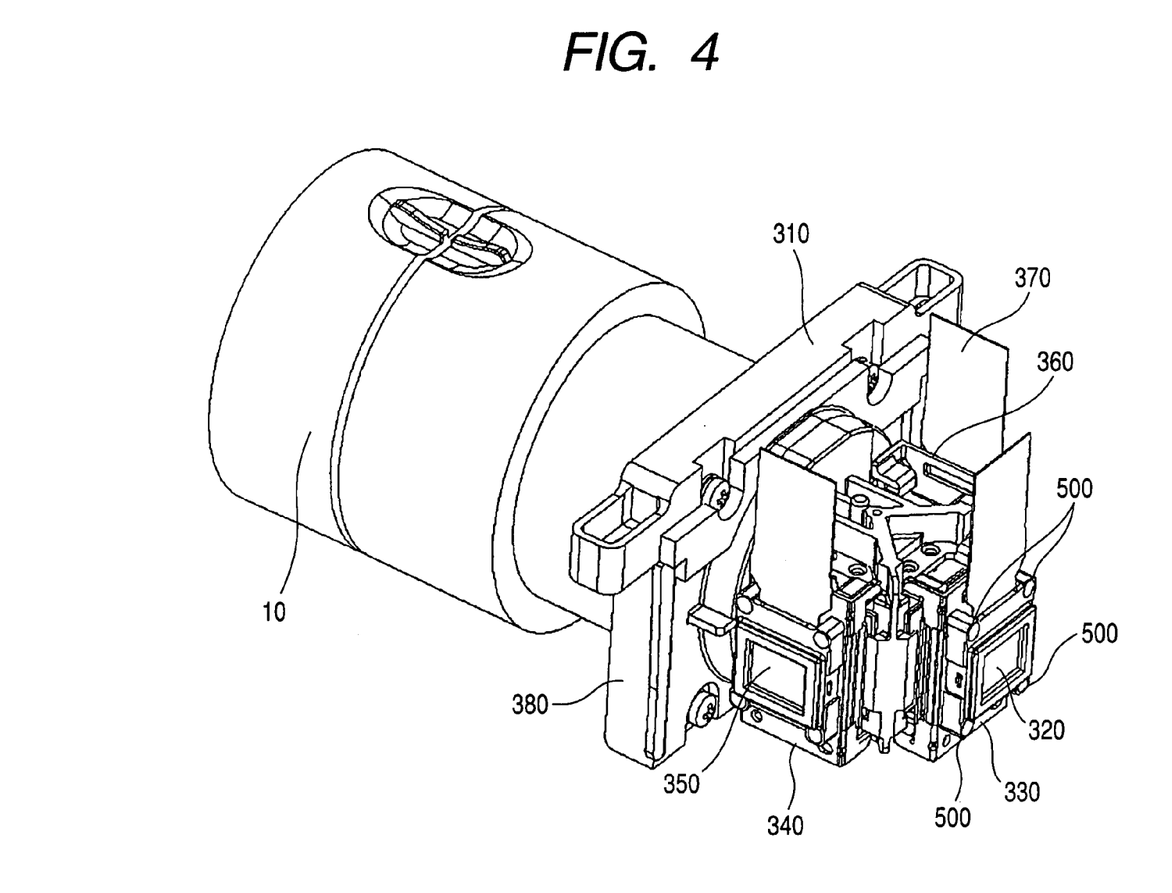
FIG. 4 is a perspective view showing the construction of a projection lens prism unit in the projection type image display device, according to the first embodiment of the present invention.

FIG. 4 illustrates a detailed construction of the prism unit in the projection type image display device 1.

In FIG. 4, a liquid crystal panel 320 as light valve means is attached to a light valve holder 330 and is supported by a prism holder 380 through the prism (not shown). The projection lens 10 is attached to an exit side of the prism holder 380.

In the prism unit 310, the prism (not shown) is mounted to the prism holder 380 and light valve holders 330, 340 and 360 are mounted so as to surround the prism. The light valve holders are formed of a thermoplastic polymer material such as a polycarbonate material. Liquid crystal panels 320, 350, and 370 are mounted to the light valve holders 330, 340, and 360, respectively. While the projection type image display device is in operation, light rays of split color components, e.g., red, green, and blue, are incident on the liquid crystal panels respectively. The incident light rays are modulated by the liquid crystal panels 320, 350, and 370 and are synthesized by the prism, followed by projection and output to the exterior of the device through the projection lens 10.

Figure 5A:
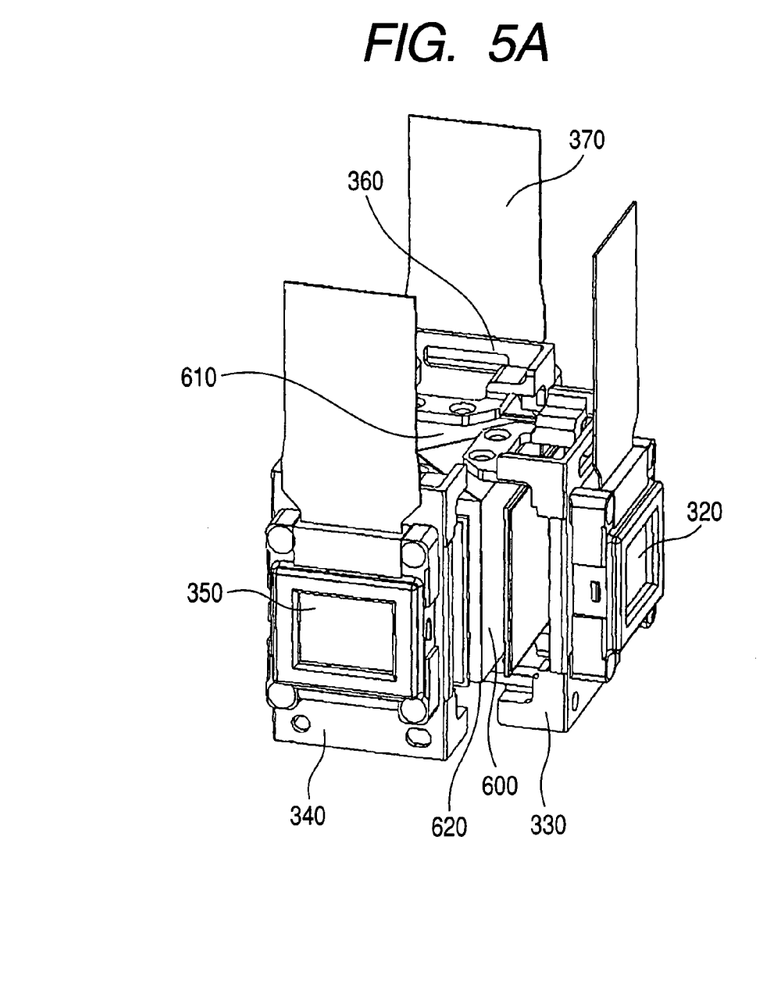
FIGS. 5A and 5B are perspective views showing the construction of a prism and liquid crystal panel portions in the projection type image display device, according to the first embodiment of the present invention.
Figure 5B:
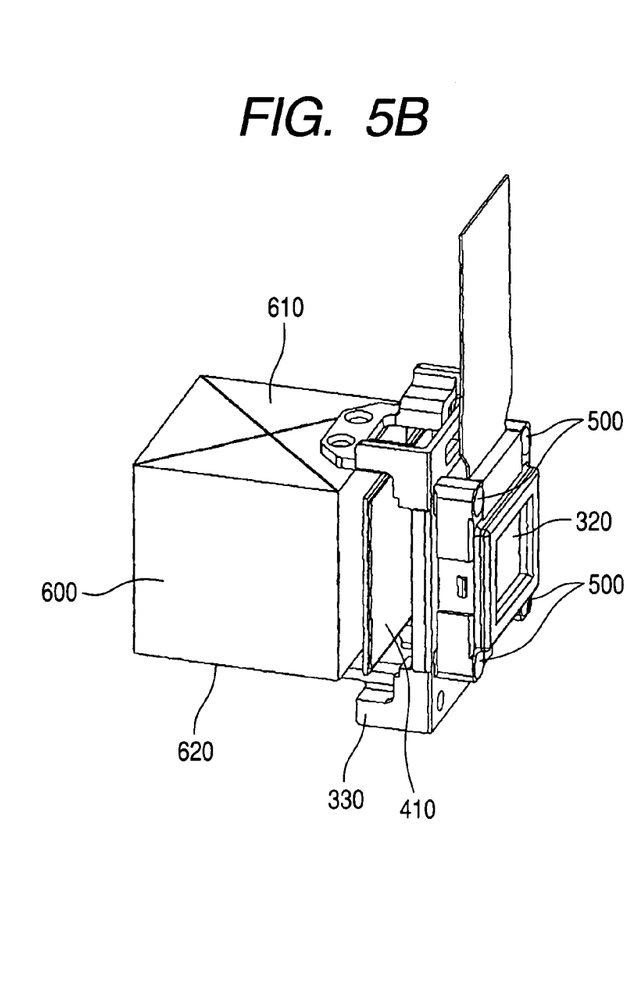

FIG. 5 illustrates in what state liquid crystal panels are mounted around the prism in the projection type image display device 1.

FIG. 5A shows a state in which liquid crystal panels for three-color components are mounted and FIG. 5B shows a state in which, out of the liquid crystal panels shown in FIG. 5A, only a liquid crystal panel for one color component is mounted for ease of understanding.

In FIG. 5, liquid crystal panels taking charge of color components respectively are mounted around a prism 600. Light valve holders 330, 340, and 360 are attached to an upper surface 610 and a lower surface 620 of the prism 600, and liquid crystal panels 320, 350, and 370, which are light valve means, are attached to those light valve holders respectively.

As shown in FIG. 5B, a polarizing plate 410 is disposed between the liquid crystal panel 320 and the prism 600. It goes without saying that the polarizing plate is disposed also between each of the other liquid crystal panels and the prism.

A description will now be given of a mechanism for displaying an image with use of the liquid crystal panels. Light incident on the liquid crystal panel 320 is made beforehand into light (e.g., S polarized light) having a uniform polarization direction by polarization changing means (not shown). At a liquid crystal portion corresponding to a set pixel, a control is made for rotating or not rotating the polarization direction in the liquid crystal panel 320 to effect modulation of incident light. Then, light from the portion corresponding to the polarization direction-rotated pixel turns to, say, P polarized light relative to the incident, say, S polarized light and the so-rotated light is outputted. In this connection, a layout is made so that the polarization direction which is set at a transmission direction of the polarizing plate 410 and the P polarization corresponding to the polarization direction of light at the above rotated pixel coincide with each other. The light of the pixel portion after the rotation of polarization in the liquid crystal panel 320 then passes through the polarizing plate 410. The unrotated S polarized light component emerging from the liquid crystal panel 320 is absorbed by the polarizing plate 410.

In this way, by the combination of the polarizing plate and the liquid crystal panel, on-off control for each pixel in the liquid crystal panel is effected, and by combining such pixel by pixel controls it becomes possible to make display as a single optical image.

Light rays outputted from the liquid crystal panels of three-color components are synthesized by the prism 600. The synthesis of three-color components is effected by a cross dichroic mirror surface (not shown) in the interior of the prism 600. For example, green light of P polarization is outputted from the liquid crystal panel 320, then passes through the prism 600 and travels straight ahead. Further, red light and blue light of S polarization are outputted from the corresponding liquid crystal panels 350 and 370, then are each reflected at right angles by the cross dichroic mirror surface (not shown) within the prism 600 and advance toward the projection lens 10. In this way, the prism 600 can synthesize images outputted from the liquid crystal panels which take charge of the three-color components respectively.

To make display positions of the three-color components coincident completely with one another, it is necessary that the three liquid crystal panels be at the same focal position and at the same screen position when looking from the projection lens 10 side. Therefore, in case of fixing the liquid crystal panels around the prism 600, alignment adjustment (convergence adjustment) for the liquid crystal panels is usually performed as in the foregoing patent literatures. If displacement of the liquid crystal panels occurs after convergence adjustment, the synthesized image will be disturbed. Therefore the position after the adjustment is fixed firmly.

In the first embodiment of the present invention, first, prior to convergence adjustment, the liquid crystal panels are fixed by fusion to the light valve holders. Then, as shown in FIG. 5, the light valve holders 330, 340 and 360 with the liquid crystal panels fused thereto are subjected to convergence adjustment relative to the prism 600. Further, after the convergence adjustment, the prism 600 and the light valve holders 330, 340 and 360 are bonded together at the upper and lower surfaces 610, 620. Thus, since the liquid crystal panels have been already fixed by fusion to the light valve holders before convergence adjustment, the liquid crystal panels after convergence adjustment are fixed in place firmly.

A mounting method for the light valve holders and the liquid crystal panels will here be described typically in terms of a method for mounting the liquid crystal panel 320 to the light valve holder 330 as in FIG. 5B. In FIG. 5B, the liquid crystal panel 320 is mounted to the light valve holder 330. As will be described later, this mounting method utilizes fusion. Mounting holes formed in the liquid crystal panel 320 are brought into engagement with projecting portions (not shown) of the light valve holder 330 formed of a thermoplastic polymer material to secure the liquid crystal panel to the light valve holder. Then tips (not shown) of the projecting portions of the light valve holder 330 are heat-melted into the shape of the mounting portion of the liquid crystal panel made of a magnesium alloy for example, whereupon cooling is performed for solidification and fixing. Thus, the liquid crystal panel is mounted by fusion. Numeral 500 indicates the fused portions. At least plural such fused portions are present. It goes without saying that the other light valves and liquid crystal panels are also mounted by fusion in the same manner.

In this case, the light valve holders 330, 340 and 360 are made of polycarbonate for example and have a melting point of, say, 160° C., while the outer frames of the liquid crystal panels 320, 350 and 370 are made of a magnesium alloy for example and have a melting point of, say, 650° C. Thus, this is a combined construction of both components different in melting point.

The fused portions 500 thus fixed after fusion is in a solidified state having a shape conforming to the shape of each mounting hole in the liquid crystal panel 320, as will be described later. In this state, the liquid crystal panel 320 cannot be removed unless the light valve holder 330 is destroyed.

Figure 6:
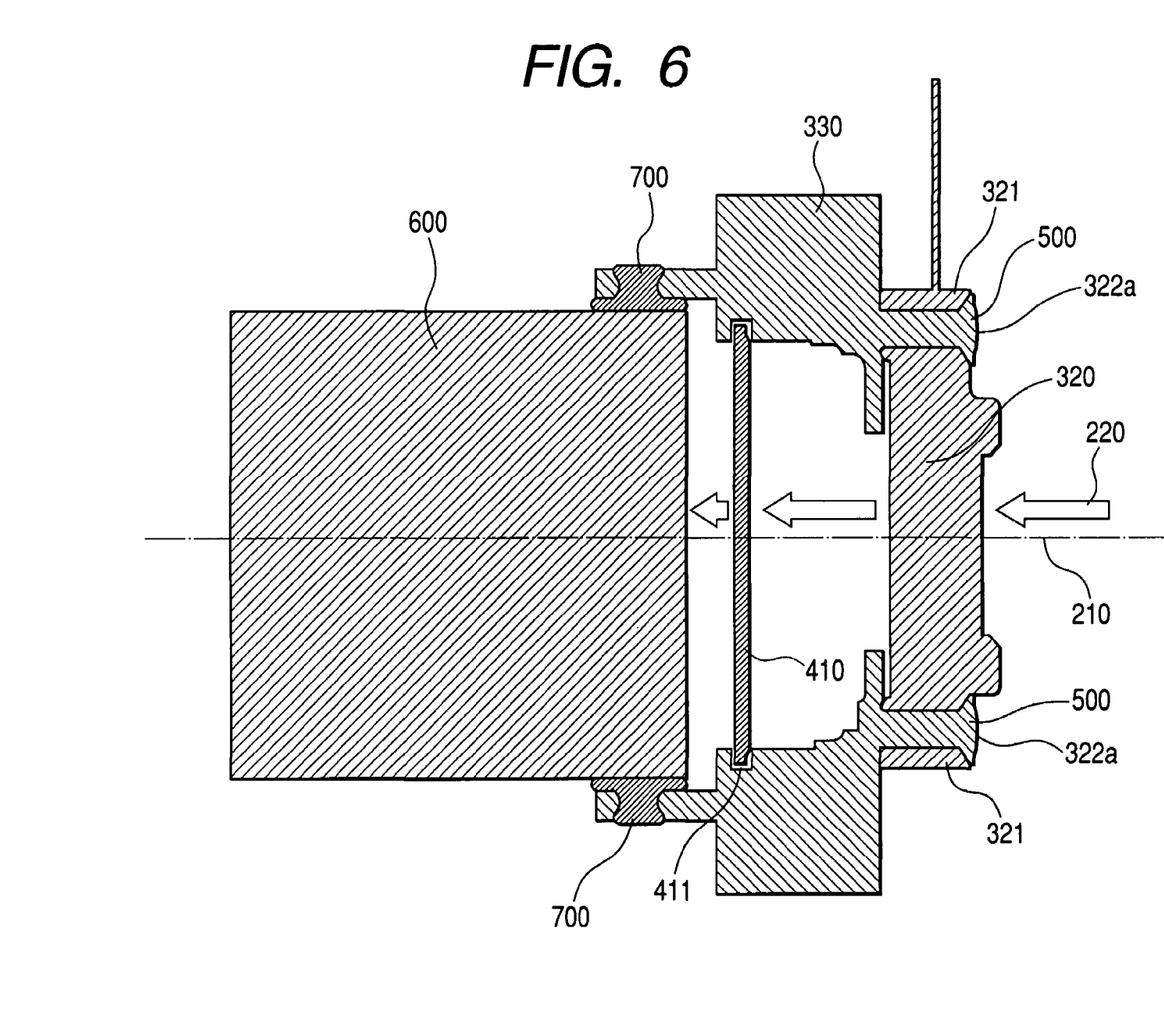
FIG. 6 is a sectional view showing the construction of the prism and a liquid crystal panel portion in the projection type image display device, according to the first embodiment of the present invention.

FIG. 6 is a sectional view showing a mounted state of the prism and a liquid crystal panel in the first embodiment. In FIG. 6, the mounted state is shown typically in terms of a mounted state of the prism 600 and the liquid crystal panel 320. It goes without saying that the other liquid crystal panels are also mounted in the same manner.

In FIG. 6, projecting portions of the light valve holder 330 are fitted in mounting holes 322a of the liquid crystal panel 320. Further, in each of the tip fused portions 500, a part of the light valve holder 330 melts in the fusing process and is cooled and solidifies in a tapered portion (conical hole) 321 of the liquid crystal panel 320 in a shape conforming to the shape of the tapered portion 321. In such a construction, the light valve holders 330, 340, 360 and the liquid crystal panels 320, 350, 370 are fixed integrally and their mounted positions do not shift easily.

The polarizing plate 410 disposed between the liquid crystal panel 320 and the prism 600 is held by a fixing groove 411 formed in the light valve holder 330. The light valve holder 330 and the prism 600 are fixed together using an adhesive 700.

Light incident on the liquid crystal panel 320 travels in the direction of arrow 220 along an optical axis 210. After being modulated by the liquid crystal panel 320, the light passes through the polarizing plate 410 and travels toward the prism 600.

As described above in connection with FIG. 5 there are three such constructions of one-color component, and light rays modulated in the liquid crystal panels advance to the prism 600 and are synthesized therein.

Figure 7A:
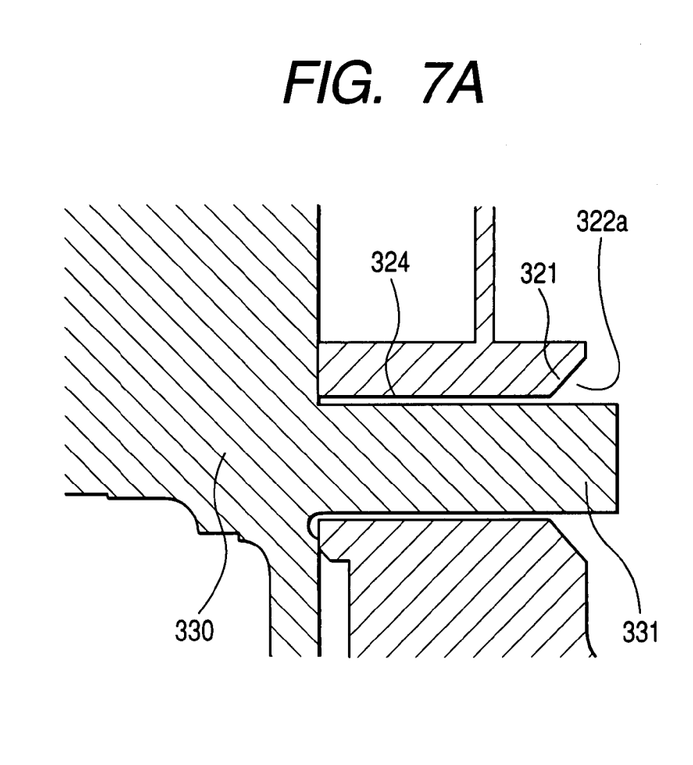
FIGS. 7A and 7B are detailed explanatory diagrams of a fused portion of a liquid crystal panel portion in the projection type image display device, according to the first embodiment of the present invention.
Figure 7B:
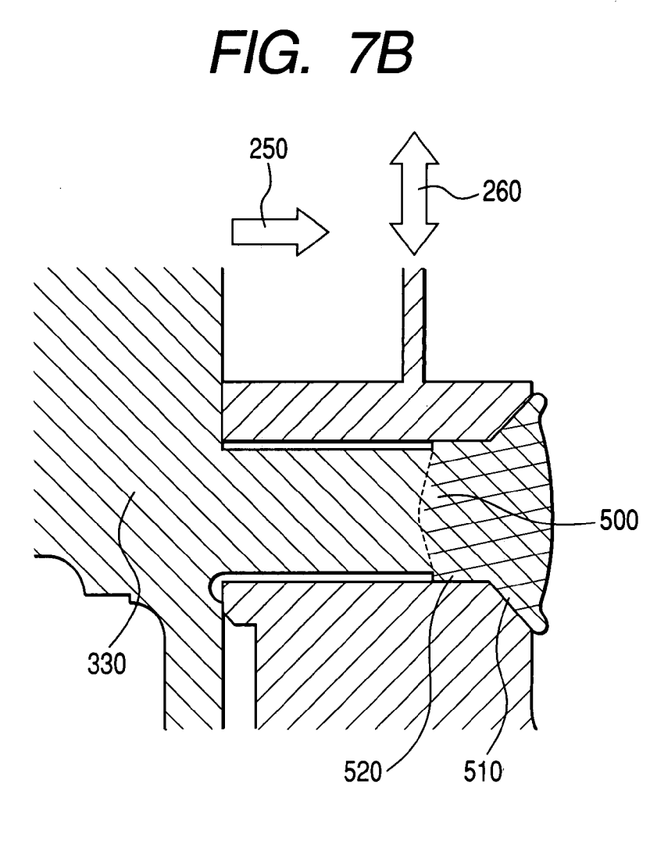

FIG. 7 is a detailed explanatory diagram of the fused portion shown in FIG. 6 in this first embodiment, in which FIG. 7A shows a state before fusion and FIG. 7B shows a state after fusion. In FIG. 7A, a fusion allowance 331 of a projecting portion in the light valve holder 330 is fitted in a mounting hole 322a of the liquid crystal panel 320. The fusion allowance 331 is smaller than the diameter of a straight portion 324 of the mounting hole 322a in the liquid crystal panel 320, leaving a clearance. The opening portion of the mounting hole 322a in the liquid crystal panel 320 is tapered at 321.

As shown in FIG. 7B, a fused portion 500 is formed after fusion. In the fused portion 500, a fusion-side tapered portion 510 is formed following the tapered portion 321 of the liquid crystal panel 320. At a part of the fused portion 500, there also is formed a fusion-side-straight portion 520 following the straight portion 324 of the mounting hole 322a in the liquid crystal panel 320. The fusing process is carried out by heating and melting a part of the fusion allowance 331 of the light valve holder 330 formed of a heat-melting polymer material. When the heat-melting polymer material melts, an internal stress is released and the material is transformed into a shape conforming to the surrounding shape. The deformed state is retained even after cooling and subsequent solidifying. In the deformed state, an internal stress is released, so that any special stress is developed between the liquid crystal panel and the light valve holder. Therefore, even if the liquid crystal panel is attached to the light valve holder, any internal stress results from the mounting, but an internal stress is released gradually after the mounting and the liquid crystal panel is not displaced from its mounted position.

Moreover, since the shape of the light valve holder is melt-deformed following the shape of the liquid crystal panel, the liquid crystal panel does not move relative to the light valve holder after the fusion process. More specifically, in the direction of arrow 250 which is an axial direction of the fused portion 500 in FIG. 7, the fusion-side tapered portion 510 is opposed to the tapered portion 321 of the liquid crystal panel 320, so that the positional relation of the liquid crystal panel 320 to the light valve holder 330 does not change. In the opposite direction, the displacement of the liquid crystal panel 320 is inhibited by the light valve holder 330. In the direction of arrow 260 which is perpendicular to the fused portion 500 in FIG. 7, the fusion-side straight portion 520 is opposed to the hole 322a formed in the liquid crystal panel 320 and thus the positional relation between the liquid crystal panel 320 and the light valve holder 330 does not change.

Only one fused portion is illustrated in FIG. 7, but as described above in connection with FIGS. 5 and 6, the plural fused portions (four in this embodiment) for mounting the liquid crystal panel are all subjected to the same fusion process, and the positional relation between the liquid crystal panel and the light valve holder is restricted not only in the arrow 250, 260 directions but also in the rotational direction. To restrict the movement in the rotational direction, at least two fused portions suffice, and in this case it is preferable that the fused portions be in a diagonal positional relation.

In this way the light valve holders 330, 340, 360 and the liquid crystal panels 320, 350, 370 can be fixed together without stress.

Figure 8:
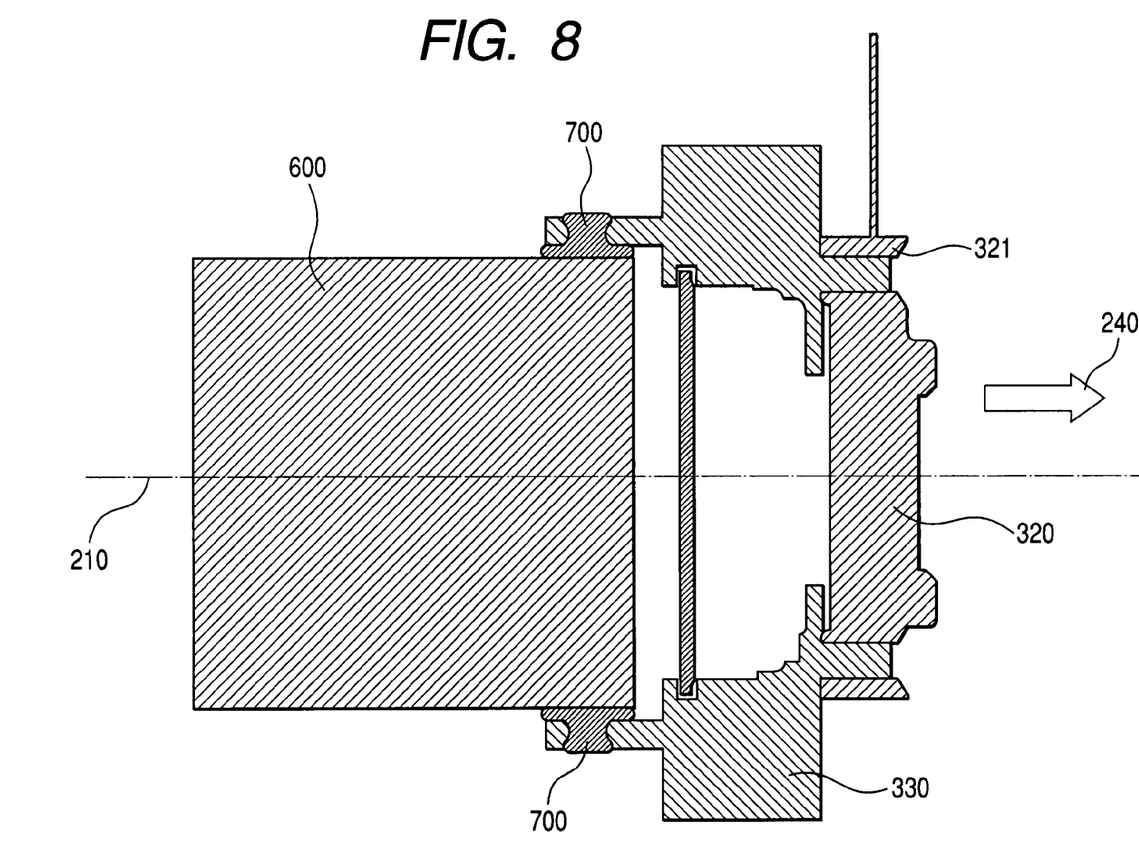
FIG. 8 is a diagram explanatory of a work for removing a liquid crystal panel portion from the projection type image display device, according to the first embodiment of the present invention.

FIG. 8 shows in what state a liquid crystal panel is removed in the first embodiment.

If one of the plural liquid crystal panels disposed around the prism 600 is defective or faulty, it is necessary that such a liquid crystal panel be removed for repair or replacement. Likewise, also in the event of failure of the prism 600, it is necessary that the liquid crystal panels disposed around the prism be-removed and mounted to another prism.

In such a case, as shown in FIG. 8, the fused portion 500 is cut with a drill or the like to let the tapered portion 321 of the liquid crystal panel 320 be exposed, whereby the liquid crystal panel-320 can be removed in the direction of arrow 240. By so doing, the liquid crystal panel 320 can be removed from the prism 600 without being damaged. Further, the light valve holder 330 formed of a heat-melting polymer material is fixed to the prism 600 through the adhesive 700 and therefore can be removed from the prism 600 easily by destroying the portion of the adhesive 700. At this time, the treated incidence surface such as a coated incidence surface of the prism 600 is not damaged because the adhesive is not applied thereto. Consequently, it is possible to re-utilize the prism 600.

Thus, according to the first embodiment of the present invention, in the event of failure of any of the expensive liquid crystal panels and prism, the replacement can be done easily by removing nondefective parts and it is possible to re-utilize the expensive nondefective parts and hence possible to provide a high quality projection type image display device at low cost.

Besides, since the liquid crystal panels are fixed by fusion, no stress is imposed on the liquid crystal panels and it is possible to effect mounting of the liquid crystal panels in a highly accurate and highly reliable state.

Figure 9A:
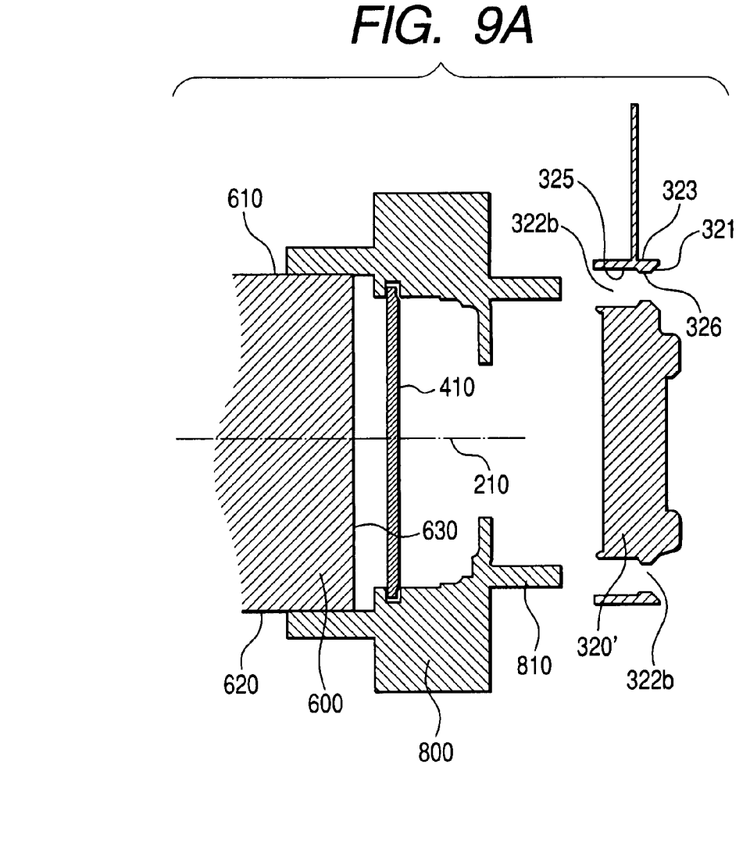
FIGS. 9A and 9B are sectional views showing the construction of a prism and a liquid crystal panel portion in a projection type image display device according to a second embodiment of the present invention.
Figure 9B:
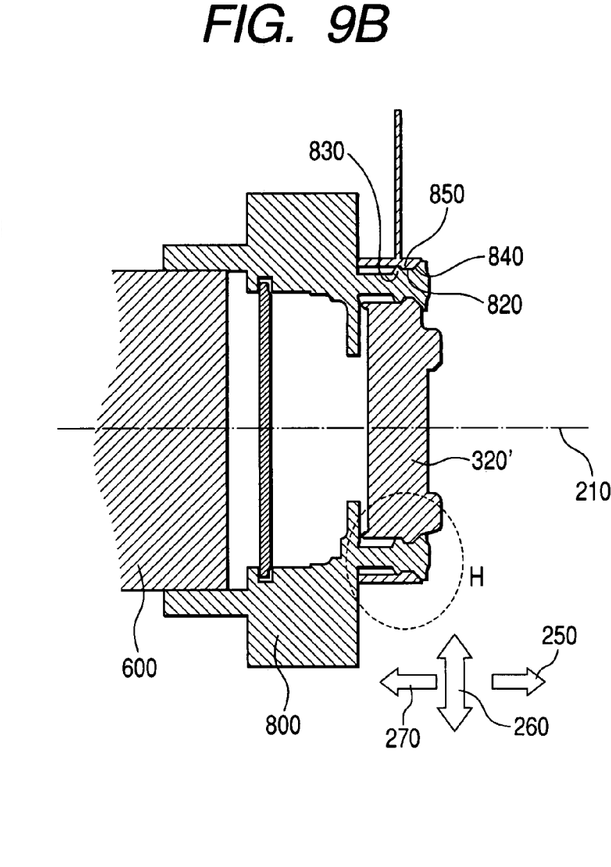
Figure 11:
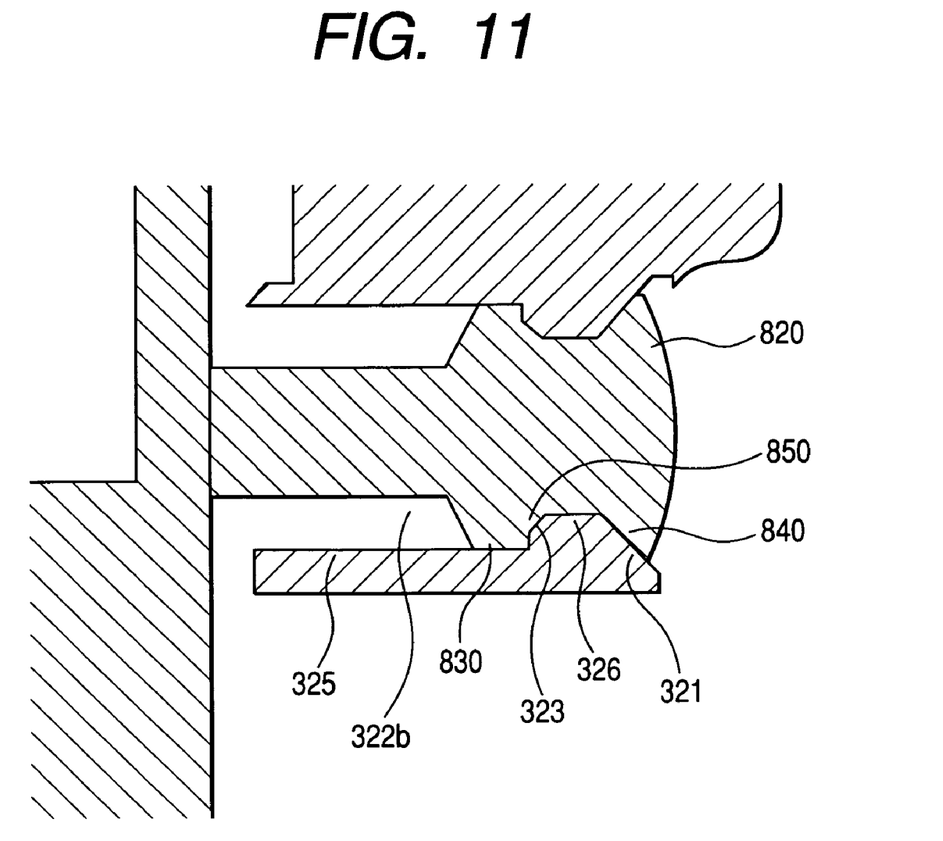
FIG. 11 is an enlarged detail view of portion H located near a fused portion in FIG. 9B.

FIGS. 9A and 9B are explanatory diagrams showing the construction of a second embodiment of the present invention. FIG. 9A illustrates a light valve holder and thereabouts and FIG. 9B illustrates a state after fusion of a liquid crystal panel to the light valve holder. In the figures, for ease of illustration of this embodiment, there are shown only one of three light valve holders and only one of three liquid crystal panels which holders and panels are installed around a prism, provided it goes without saying that the illustrated construction is also true of the other two light valve holders and the other two liquid crystal panels. FIG. 11 is an enlarged detail view of portion H located near a fused portion in FIG. 9B.

In FIG. 9A, a light valve holder 800 formed by integral molding, so-called outsert molding, of a heat-melting polymer material is disposed in a surrounding relation to a prism 600. The light valve holder 800 is fixed to an upper surface 610 and a lower surface 620 of the prism 600. In the second embodiment, unlike the first embodiment, since the light valve holder 800 is formed by outsert molding, there is no fear of displacement of the light valve holder 800 relative to the prism 600. In the event the necessity of removal of the light valve holder 800 should occur due to failure for example, the outsert-molded light valve holder is peeled off from both upper and lower surfaces of the prism. That is, a light incidence surface 630 of the prism having been subject to an expensive surface treatment is not damaged and it is possible to re-utilize the prism 600.

In this embodiment, mounting holes 322b are formed in a liquid crystal panel 320' for insertion therein of fusion allowances 810 of projecting portions of the light valve holder 800. On an inner wall of each of the mounting holes 322b there is formed a projecting portion 326 having a tapered portion 321 and a tapered portion 323. When the fusion allowance 810 is melted after insertion of the fusion allowance 810 of each projecting portion of the light valve holder 800 into the corresponding mounting hole 322b formed in the liquid crystal panel 320', the projecting portion 326 is sandwiched in between fusion-side tapered portions 840 and 850 which are opposed to the tapered portions 321 and 323, respectively. This state is shown in FIG. 9B and FIG. 11.

In FIG. 9B showing a fused state of the liquid crystal panel 320', as is apparent from the enlarged detail view of FIG. 11 showing portion H in FIG. 9B, the fusion-side tapered portions 840, 830, and 850 are in close contact, in a fused portion 820, with the tapered portion 321, a straight portion 325, and the tapered portion 323, respectively, of the mounting hole 322b formed in the liquid crystal panel 320'. In this embodiment illustrated in FIG. 9, fusion is performed after adjustment of the posture (convergence adjustment) of the liquid crystal panel 320'.

To illustrate a state in which the posture of the liquid crystal panel 320' has been adjusted relative to the prism 600, FIG. 9B shows a state in which the light valve holder 800 and the liquid crystal panel 320' are mounted in an inclined and floating condition. Thus, when the liquid crystal panel 320' is mounted in an inclined and floating state relative to the light valve holder 800 by adjustment of its posture, the liquid crystal panel is held in a fixed stated under the action of the fused portion 820. That is, when the liquid crystal panel tends to move in the direction of arrow 250, this movement cannot-be effected because the fusion-side tapered portion 840 is in opposition to the tapered portion 321 of the liquid crystal panel 320'. When the liquid crystal panel tends to move in the direction of arrow 260, the movement is inhibited by the fusion-side straight portion 830 which is in opposition to the straight portion 325 of the liquid crystal panel 320'. When the liquid crystal panel tends to move in the direction of arrow 270, the movement is inhibited by the fusion-side tapered portion 850 which is in opposition to the tapered portion 323 of the liquid crystal panel 320'. The rotational direction of the liquid crystal panel can be inhibited by forming plural fused portions.

Thus, according to the construction of this embodiment, light valve holders are formed by outsert molding around the prism, a projecting portion having tapered portions is formed on an inner wall of each mounting hole in each liquid crystal panel, and the liquid crystal panel is fixed by fusion to the corresponding light valve holder after positioning. With this construction, the position of each liquid crystal panel relative to the prism is fixed without displacement and therefore it is possible to provide a high quality image display device. Further, in the event of failure of any of plural liquid crystal panels, the light valve holders are destroyed and the prism and the nondefective liquid crystal panels are removed and can be re-utilized.

Figure 10:
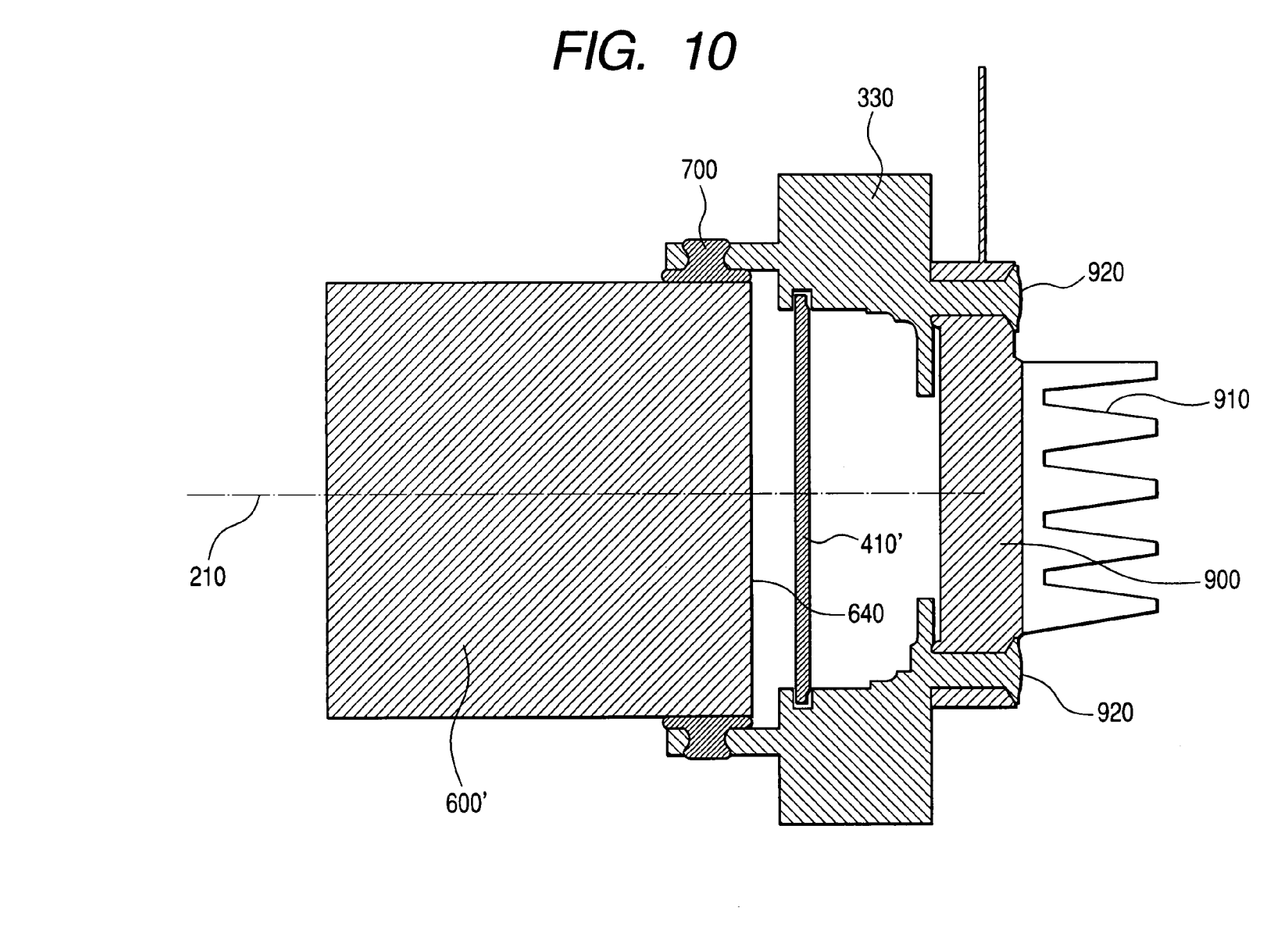
FIG. 10 is a sectional view showing the construction of a prism and a liquid crystal panel portion in a projection type image display device according to a third embodiment of the present invention.

FIG. 10 is an explanatory diagram illustrating a third embodiment of the present invention. In this third embodiment, reflection type liquid crystal panels are used as light valve means instead of the transmission type liquid crystal panels used in the first and second embodiments.

A light valve holder 330 is attached with an adhesive 700 to other surfaces than a light incidence surface 640 of a PBS prism 600'. Moreover, a quarter wave plate 410' and a reflection type liquid crystal panel 900 are attached to the light valve holder 330, the panel 900 being fixed by a fused portion 900. Further, a heat radiation board 910 is attached to a rear side of the reflection type liquid crystal panel 900.

Thus, also in the construction of the reflection type liquid crystal panel, the positions of liquid crystal panels are fixed without displacement and hence it is possible to provide a high quality projection type image display device. Further, in the event of failure of any of plural liquid crystal panels, it is possible to destroy the light valve holders, take out the prism and the nondefective liquid crystal panels and re-utilize them.

Although liquid crystal panels (transmission type) or reflection type liquid crystal panels are used as light valve means in the above embodiments, it goes without saying that the same constructions and effects as above can also be attained by using other light valve means, e.g., micromirror rotation means.

Although a three-color synthesizing cross dichroic mirror or PBS prism is used as the prism, it goes without saying that even a synthesizing system or a two-color synthesizing system using another prism, e.g., a triangular prism (a total reflection prism), can attain the same constructions and effects as above.

In the above embodiments the external member of each liquid crystal panel is made of a magnesium alloy and each light valve holder is made of a polycarbonate. However, it goes without saying that no limitation is made thereto and that a combination of other polymer materials may be used, such as a polycarbonate as the outer member of each liquid crystal panel and ABS resin as the material of each light valve holder, insofar as the difference between the respective melting points is 40° or more, whereby the same constructions and effects as above can be obtained.

Further, in the above embodiments heat-fusion is used as liquid crystal panel fixing means. However, it goes without saying that no limitation is made thereto, but another means may be adopted, e.g., ultrasonic fusion, insofar as a part of each light valve holder made of a thermoplastic material is eventually melted and cooled to solidify and fixed following the shape of the corresponding liquid crystal panel, whereby the same constructions and effects as above can be obtained.

According to the present invention, as set forth above, a projection type image display device can be provided in which mounted positions of a prism and light valves can be maintained in a stable state relative to each other, and it is possible to ensure a high quality image. Further, in the event of failure of a part of such expensive parts as a prism and light valves, it is possible to remove and re-utilize the other nondefective expensive parts.

Thus, according to the present invention it is possible to reduce the cost of a projection type image display device.

What is claimed is:

1. A projection type image display device comprising:
an illumination unit;
a light splitting unit which divides illumination light emitted from the illumination unit into plural color components;
plural light valves each of which modulates one of the split light rays of the plural color components;
a synthesizing unit which synthesizes the modulated light rays output from the plural light valves;
a projection unit which projects the resulting synthesized modulated light; and
plural support holders formed of a heat-melting polymer material, each of the support holders being directly mounted to one of the plural light valves by heat-fusion of the polymer material and being fixed to the synthesizing unit.

2. The projection type image display device according to claim 1, wherein the plural support holders are formed by integral injection molding of a polymer material fixed to the synthesizing unit.

3. The projection type image display device according to claim 1, wherein each of the plural light valves is fused to a corresponding one of the plural support holders by using at least two surfaces thereof comprising a tapered portion and a straight portion.

4. The projection type image display device according to claim 1, wherein when each of the plural light valves is fixed to the corresponding one of the plural support holders, the position of each of the plural light valves is adjusted.

5. The projection type image display device according to claim 1, wherein each of the plural support holders includes a groove for fixing a polarizing plate.

6. A projection type image display device comprising:
an illumination unit;
a light splitting unit which divides illumination light emitted from the illumination unit into plural color components;
plural light valves each of which modulates one of the plural color components;
a synthesizing unit which synthesizes the modulated light rays output from the plural light valves, each unit including a upper surface and a lower surface;
a projection unit which projects the resulting synthesized modulated light; and
plural support holders formed of a heat-melting polymer material, each of the support holders being directly mounted to one of the plural light valves by heat-fusion of the heat-melting polymer material and being fixed to the synthesizing unit;
wherein each of the support holders is fixed to the upper surface and the lower surface of the synthesizing unit.

7. The projection type image display device according to claim 6, wherein the plural support holders are formed by integral injection molding of a polymer material fixed to the synthesizing unit.

8. The projection type image display device according to claim 6, wherein each of the plural light valves is fused to a corresponding one of the plural support holders using at least two surfaces thereof which include a tapered portion and a straight portion.

9. The projection type image display device according to claim 6, wherein when each of the plural light valves is fixed to a corresponding one of the plural support holders, the positions of each of the plural light valves is adjusted with respect to each other.

10. The projection type image display device according to claim 6, wherein each of the plural light valves is fixed by fusion to a corresponding one of the plural support holders after adjusting the position of the plural light valves.

11. The projection type image display device according to claim 6, wherein each of the plural light valves is fused to a corresponding one of the plural support holders by using at least two surfaces thereof comprising a tapered portion and a straight portion.

12. The projection type image display device according to claim 6, wherein when each of the plural light valves is fixed to a corresponding one of the plural support holders, the position of each of the plural light valves is adjusted at the time of fixing one of the plural support holders and the synthesizing unit to each other.

13. The projection type image display device according to claim 6, wherein each of the plural support holders includes a groove for fixing a polarizing plate.

14. The projection type image display device according to claim 6, wherein the modulated light rays are not transmitted through the upper surface and the lower surface of the synthesizing unit.

15. A projection type image display device comprising:
an illumination unit;
a light-splitting unit which divides illumination light emitted from the illumination unit into plural color components;
plural light valves each of which modulates the plural color components;
a synthesizing unit which synthesizes the modulated light rays output from the plural light valves;
a projection unit which projects and displays the resulting synthesized modulated light; and plural support holders formed of a heat-melting polymer material, each of which is directly mounted to one of the plural light valves and fixed to the synthesizing unit;

wherein a melting point of the material of a profile portion of each of the plural light valves and that of the material of a mounting portion of each of the plural support holders are at least 40 degrees apart from each other.

16. The projection type image display device according to claim 15, wherein each of the plural support holders includes a groove for fixing a polarizing plate.

17. The projection type image display device according to claim 15, wherein the plural support holders are formed by integral injection molding of a polymer material fixed to the synthesizing unit.

18. The projection type image display device according to claim 15, wherein when each of the plural light valves is fixed to corresponding one of the plural support holders, the position of each of the plural light valves is adjusted at the time of fixing one of the plural support holders and the synthesizing unit to each other.

19. The projection type image display device according to claim 15, wherein each of the plural support holders is formed of a heat-melting polymer material.

20. The projection type image display device according to claim 15, wherein each of the plural support holders is fixed to the upper surface and the lower surface of the synthesizing unit.

* * * * *